(12) United States Patent
Sirvisetti et al.

(10) Patent No.: US 12,699,644 B2
(45) Date of Patent: Aug. 4, 2026

(54) METHOD AND SYSTEM FOR PROVIDING TEST AND REGRESSION AUTOMATION

(71) Applicant: JPMorgan Chase Bank, N.A., New York, NY (US)

(72) Inventors: Anand Sirvisetti, Kakinada (IN); Swathi Yenumula, Hyderabad (IN); Abdul Subhan Shoukat Ghouse, Hyderabad (IN); Pawan Kumar, Miyapur (IN); Shravan Muriki, Siddipet (IN)

(73) Assignee: JPMORGAN CHASE BANK, N.A., New York, NY (US)

( * ) Notice: Subject to any disclaimer, the term of this patent is extended or adjusted under 35 U.S.C. 154(b) by 175 days.

(21) Appl. No.: 17/969,277

(22) Filed: Oct. 19, 2022

(65) Prior Publication Data

US 2024/0078169 A1 Mar. 7, 2024

(30) Foreign Application Priority Data

Sep. 3, 2022 (IN) .............................. 202211050392

(51) Int. Cl.
*G06F 9/44* (2018.01)
*G06F 11/3668* (2025.01)

(52) U.S. Cl.
CPC ...... *G06F 11/3688* (2013.01); *G06F 11/3692* (2013.01)

(58) Field of Classification Search
CPC .......................... G06F 11/3688; G06F 11/3692
See application file for complete search history.

(56) References Cited

U.S. PATENT DOCUMENTS

| | | | | |
|---|---|---|---|---|
| 2014/0075242 A1* | 3/2014 | Dolinina | ............. | G06F 11/3672 |
| | | | | 714/E11.178 |
| 2015/0106791 A1* | 4/2015 | Karuppiah | .......... | G06F 11/3688 |
| | | | | 717/127 |
| 2015/0371134 A1* | 12/2015 | Chien | ................ | G05B 23/0294 |
| | | | | 706/21 |
| 2017/0010959 A1* | 1/2017 | Smith | ................. | G06F 11/3688 |
| 2018/0196731 A1* | 7/2018 | Moorthi | ............. | G06F 11/3688 |
| 2018/0321918 A1* | 11/2018 | Mcclory | ............. | H04L 41/5041 |
| 2021/0133089 A1* | 5/2021 | Khillar | ................ | G06F 16/9024 |
| 2021/0286703 A1* | 9/2021 | Cmielowski | ........... | G06N 20/10 |
| 2022/0129754 A1* | 4/2022 | Wu | ........................ | G06N 20/00 |
| 2022/0237500 A1* | 7/2022 | Dinh | ........................ | G06N 5/01 |
| 2023/0073760 A1* | 3/2023 | Pai | ........................ | G06F 11/302 |

* cited by examiner

*Primary Examiner* — Bradley A Teets
*Assistant Examiner* — Lenin Paulino
(74) *Attorney, Agent, or Firm* — Greenblum & Bernstein, P.L.C.

(57) ABSTRACT

A method for providing test and regression automation via a cloud native elastic tool is disclosed. The method includes obtaining test configurations, the test configurations corresponding to a test suite; parsing the test configurations to identify testing conditions for the test suite; automatically determining testing parameters for executing the test suite based on the identified testing conditions; executing the test suite based on the automatically determined testing parameters in a computing environment, the computing environment including a distributed computing environment; verifying results of the executing; and generating a report for the test suite, the report including information that corresponds to the automatically determined testing parameters, an execution status, and a verification result.

20 Claims, 6 Drawing Sheets

400

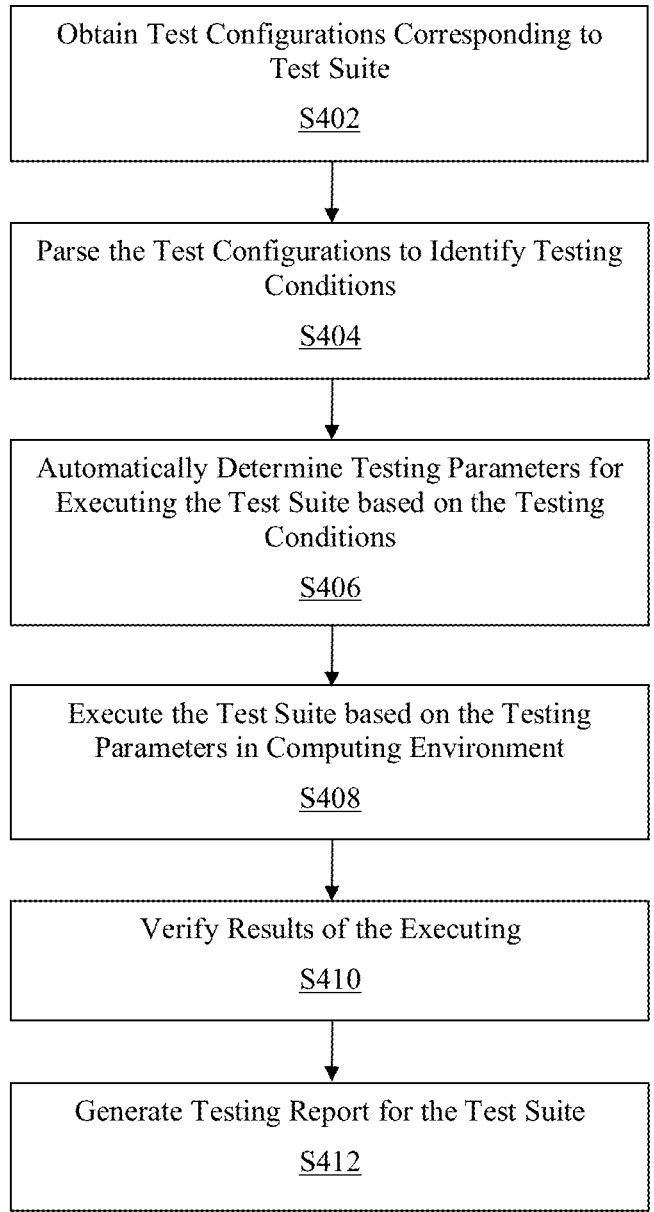

Obtain Test Configurations Corresponding to
Test Suite

S402

Parse the Test Configurations to Identify Testing
Conditions

S404

Automatically Determine Testing Parameters for
Executing the Test Suite based on the Testing
Conditions

S406

Execute the Test Suite based on the Testing
Parameters in Computing Environment

S408

Verify Results of the Executing

S410

Generate Testing Report for the Test Suite

METHOD AND SYSTEM FOR PROVIDING TEST AND REGRESSION AUTOMATION

CROSS-REFERENCE TO RELATED APPLICATIONS

This application claims the benefit of Indian Non-Provisional Patent Application No. 202211050392, filed Sep. 3, 2022, which is hereby incorporated by reference in its entirety.

BACKGROUND

1. Field of the Disclosure

This technology generally relates to methods and systems for automated testing, and more particularly to methods and systems for facilitating quality assurance testing in various computing environments by providing test and regression automation via a cloud native elastic tool.

2. Background Information

Many business entities develop and deploy big data projects that facilitate management and analysis of large data collections. Often, the big data projects must be thoroughly tested prior to deployment to ensure satisfactory operation. Historically, implementations of conventional techniques for testing the big data projects have resulted in varying degrees of success with respect to resource utilization and testing effectiveness.

One drawback of using the conventional techniques for testing the big data projects is that in many instances, a test suite may comprise hundreds of complex test cases that each require a different set of input for execution in a computing environment such as, for example, a cloud computing environment. As a result, adequate testing of the test suite in various different operating environments require large resource investments. Additionally, for testing in cloud-based computing environments, test runs may result in exceptions due to cluster instabilities. When this occurs, further resource investments are necessary because the test runs must be re-executed to satisfy testing requirements.

Therefore, there is a need to provide testing automation via a cloud native elastic tool that facilitates effective and efficient quality assurance testing in a variety of computing environments.

SUMMARY

The present disclosure, through one or more of its various aspects, embodiments, and/or specific features or sub-components, provides, inter alia, various systems, servers, devices, methods, media, programs, and platforms for facilitating quality assurance testing in various computing environments by providing test and regression automation via a cloud native elastic tool.

According to an aspect of the present disclosure, a method for providing test and regression automation via a cloud native elastic tool is disclosed. The method is implemented by at least one processor. The method may include obtaining at least one test configuration, the at least one test configuration may correspond to at least one test suite; parsing the at least one test configuration to identify at least one testing condition for the at least one test suite; automatically determining at least one testing parameter for executing the at least one test suite based on the identified at least one testing condition; executing the at least one test suite based on the automatically determined at least one testing parameter in a computing environment, the computing environment may include a distributed computing environment; verifying at least one result of the executing; and generating a report for the at least one test suite, the report may include information that corresponds to the automatically determined at least one testing parameter, an execution status, and a verification result.

In accordance with an exemplary embodiment, the method may further include detecting at least one error that corresponds to execution of the at least one test suite, the at least one error may include a testing failure due to an instability in the computing environment; and automatically initiating an action to re-execute the at least one test suite based on an analysis of the at least one error.

In accordance with an exemplary embodiment, the method may further include generating at least one alert when the at least one error is detected, the at least one alert may include information that relates to the at least one error, the automatically initiated action, and a determined origin of the at least one error; and notifying at least one responsible user with the at least one alert.

In accordance with an exemplary embodiment, the at least one test configuration may define at least one dependency and at least one testing sequence priority for each of a plurality of test cases that corresponds to the at least one test suite, each of the plurality of test cases may include at least one predefined input and at least one predefined, expected output.

In accordance with an exemplary embodiment, the automatically determined at least one testing parameter may facilitate execution of the at least one test suite on at least one from among a cloud computing environment and an on-premise computing environment, the facilitation may include adjustment of at least one dependency and at least one testing sequence priority for each of a plurality of test cases that corresponds to the at least one test suite.

In accordance with an exemplary embodiment, to automatically determine the at least one testing parameter, the method may further include determining, by using at least one model, at least one predicted dependency for each of a plurality of test cases that corresponds to the at least one test suite; determining, by using the at least one model, at least one predicted outcome for each of the plurality of test cases; and determining, by using the at least one model, at least one potential point of failure and a corresponding cause for each of the plurality of test cases.

In accordance with an exemplary embodiment, the at least one model may include at least one from among a machine learning model, a mathematical model, a process model, and a data model.

In accordance with an exemplary embodiment, the at least one test suite may be executed based on a predetermined schedule that is defined in the at least one test configuration, the predetermined schedule may include at least one from among a continuous testing schedule and an intermittent testing schedule.

In accordance with an exemplary embodiment, to verify the at least one result, the method may further include automatically comparing each of the at least one result with a corresponding output of a secondary execution of the at least one test suite, the secondary execution may relate to secondary testing of the at least one test suite from a different branch of a source code repository hosting service; automatically determining, by using regression analysis and validation analysis, a verified status for each of the at least one result based on an outcome of the comparing, the verified status may include at least one from among a passed status and a failed status; and automatically marking each of the at least one result with the corresponding verified status.

According to an aspect of the present disclosure, a computing device configured to implement an execution of a method for providing test and regression automation via a cloud native elastic tool is disclosed. The computing device including a processor; a memory; and a communication interface coupled to each of the processor and the memory, wherein the processor may be configured to obtain at least one test configuration, the at least one test configuration may correspond to at least one test suite; parse the at least one test configuration to identify at least one testing condition for the at least one test suite; automatically determine at least one testing parameter for executing the at least one test suite based on the identified at least one testing condition; execute the at least one test suite based on the automatically determined at least one testing parameter in a computing environment, the computing environment may include a distributed computing environment; verify at least one result of the executing; and generate a report for the at least one test suite, the report may include information that corresponds to the automatically determined at least one testing parameter, an execution status, and a verification result.

In accordance with an exemplary embodiment, the processor may be further configured to detect at least one error that corresponds to execution of the at least one test suite, the at least one error may include a testing failure due to an instability in the computing environment; and automatically initiate an action to re-execute the at least one test suite based on an analysis of the at least one error.

In accordance with an exemplary embodiment, the processor may be further configured to generate at least one alert when the at least one error is detected, the at least one alert may include information that relates to the at least one error, the automatically initiated action, and a determined origin of the at least one error; and notify at least one responsible user with the at least one alert.

In accordance with an exemplary embodiment, the at least one test configuration may define at least one dependency and at least one testing sequence priority for each of a plurality of test cases that corresponds to the at least one test suite, each of the plurality of test cases may include at least one predefined input and at least one predefined, expected output.

In accordance with an exemplary embodiment, the automatically determined at least one testing parameter may facilitate execution of the at least one test suite on at least one from among a cloud computing environment and an on-premise computing environment, the facilitation may include adjustment of at least one dependency and at least one testing sequence priority for each of a plurality of test cases that corresponds to the at least one test suite.

In accordance with an exemplary embodiment, to automatically determine the at least one testing parameter, the processor may be further configured to determine, by using at least one model, at least one predicted dependency for each of a plurality of test cases that corresponds to the at least one test suite; determine, by using the at least one model, at least one predicted outcome for each of the plurality of test cases; and determine, by using the at least one model, at least one potential point of failure and a corresponding cause for each of the plurality of test cases.

In accordance with an exemplary embodiment, the at least one model may include at least one from among a machine learning model, a mathematical model, a process model, and a data model.

In accordance with an exemplary embodiment, the processor may be further configured to execute the at least one test suite based on a predetermined schedule that is defined in the at least one test configuration, the predetermined schedule may include at least one from among a continuous testing schedule and an intermittent testing schedule.

In accordance with an exemplary embodiment, to verify the at least one result, the processor may be further configured to automatically compare each of the at least one result with a corresponding output of a secondary execution of the at least one test suite, the secondary execution may relate to secondary testing of the at least one test suite from a different branch of a source code repository hosting service; automatically determine, by using regression analysis and validation analysis, a verified status for each of the at least one result based on an outcome of the comparing, the verified status may include at least one from among a passed status and a failed status; and automatically mark each of the at least one result with the corresponding verified status.

According to an aspect of the present disclosure, a non-transitory computer readable storage medium storing instructions for providing test and regression automation via a cloud native elastic tool is disclosed. The storage medium including executable code which, when executed by a processor, may cause the processor to obtain at least one test configuration, the at least one test configuration may correspond to at least one test suite; parse the at least one test configuration to identify at least one testing condition for the at least one test suite; automatically determine at least one testing parameter for executing the at least one test suite based on the identified at least one testing condition; execute the at least one test suite based on the automatically determined at least one testing parameter in a computing environment, the computing environment may include a distributed computing environment; verify at least one result of the executing; and generate a report for the at least one test suite, the report may include information that corresponds to the automatically determined at least one testing parameter, an execution status, and a verification result.

In accordance with an exemplary embodiment, the executable code which, when executed by the processor, may further cause the processor to detect at least one error that corresponds to execution of the at least one test suite, the at least one error may include a testing failure due to an instability in the computing environment; and automatically initiate an action to re-execute the at least one test suite based on an analysis of the at least one error.

BRIEF DESCRIPTION OF THE DRAWINGS

The present disclosure is further described in the detailed description which follows, in reference to the noted plurality of drawings, by way of non-limiting examples of preferred embodiments of the present disclosure, in which like characters represent like elements throughout the several views of the drawings.

FIG. 4 is a flowchart of an exemplary process for implementing a method for facilitating quality assurance testing in various computing environments by providing test and regression automation via a cloud native elastic tool.

DETAILED DESCRIPTION

Through one or more of its various aspects, embodiments and/or specific features or sub-components of the present disclosure are intended to bring out one or more of the advantages as specifically described above and noted below.

The examples may also be embodied as one or more non-transitory computer readable media having instructions stored thereon for one or more aspects of the present technology as described and illustrated by way of the examples herein. The instructions in some examples include executable code that, when executed by one or more processors, cause the processors to carry out steps necessary to implement the methods of the examples of this technology that are described and illustrated herein.

Figure 1:
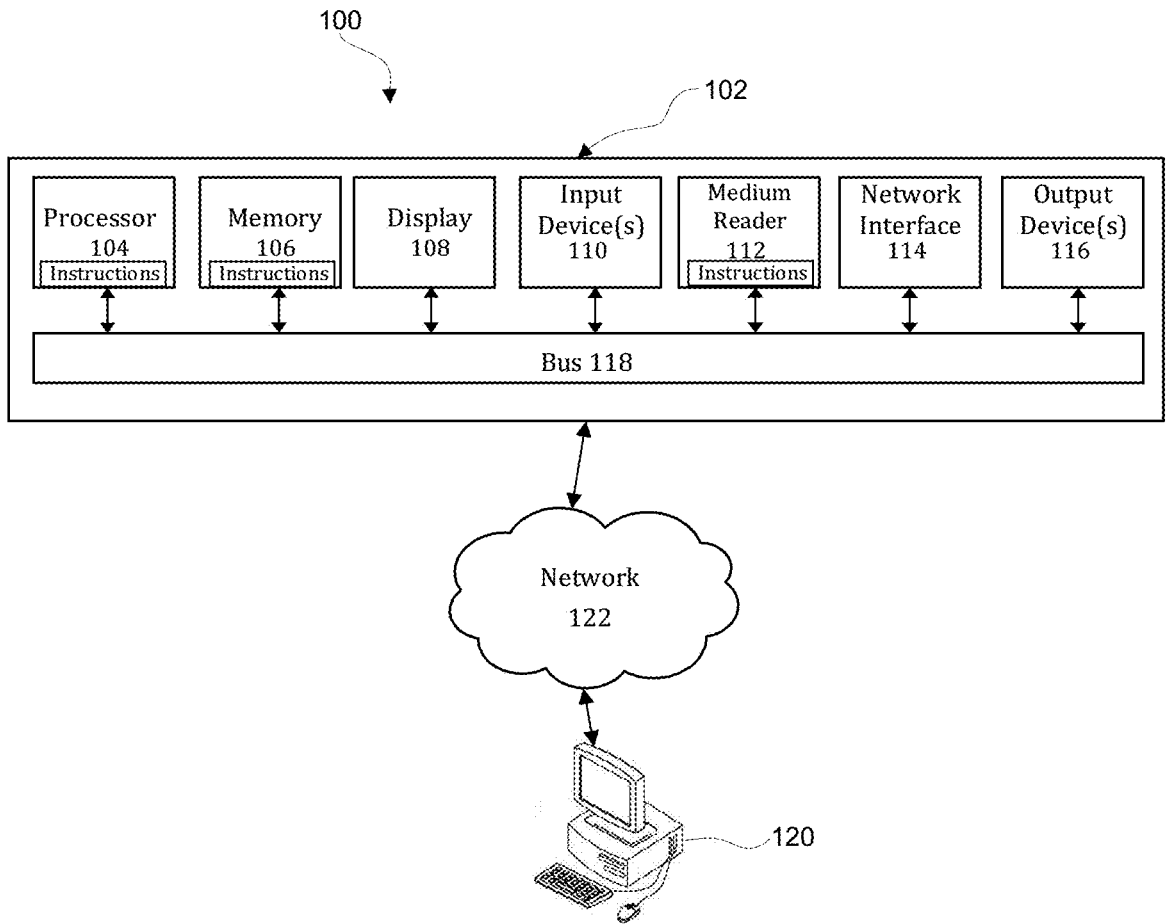
FIG. 1 illustrates an exemplary computer system.

FIG. 1 is an exemplary system for use in accordance with the embodiments described herein. The system 100 is generally shown and may include a computer system 102, which is generally indicated.

The computer system 102 may include a set of instructions that can be executed to cause the computer system 102 to perform any one or more of the methods or computer-based functions disclosed herein, either alone or in combination with the other described devices. The computer system 102 may operate as a standalone device or may be connected to other systems or peripheral devices. For example, the computer system 102 may include, or be included within, any one or more computers, servers, systems, communication networks or cloud environment. Even further, the instructions may be operative in such cloud-based computing environment.

In a networked deployment, the computer system 102 may operate in the capacity of a server or as a client user computer in a server-client user network environment, a client user computer in a cloud computing environment, or as a peer computer system in a peer-to-peer (or distributed) network environment. The computer system 102, or portions thereof, may be implemented as, or incorporated into, various devices, such as a personal computer, a virtual desktop computer, a tablet computer, a set-top box, a personal digital assistant, a mobile device, a palmtop computer, a laptop computer, a desktop computer, a communications device, a wireless smart phone, a personal trusted device, a wearable device, a global positioning satellite (GPS) device, a web appliance, or any other machine capable of executing a set of instructions (sequential or otherwise) that specify actions to be taken by that machine. Further, while a single computer system 102 is illustrated, additional embodiments may include any collection of systems or sub-systems that individually or jointly execute instructions or perform functions. The term "system" shall be taken throughout the present disclosure to include any collection of systems or sub-systems that individually or jointly execute a set, or multiple sets, of instructions to perform one or more computer functions.

As illustrated in FIG. 1, the computer system 102 may include at least one processor 104. The processor 104 is tangible and non-transitory. As used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The processor 104 is an article of manufacture and/or a machine component. The processor 104 is configured to execute software instructions in order to perform functions as described in the various embodiments herein. The processor 104 may be a general-purpose processor or may be part of an application specific integrated circuit (ASIC). The processor 104 may also be a microprocessor, a microcomputer, a processor chip, a controller, a microcontroller, a digital signal processor (DSP), a state machine, or a programmable logic device. The processor 104 may also be a logical circuit, including a programmable gate array (PGA) such as a field programmable gate array (FPGA), or another type of circuit that includes discrete gate and/or transistor logic. The processor 104 may be a central processing unit (CPU), a graphics processing unit (GPU), or both. Additionally, any processor described herein may include multiple processors, parallel processors, or both. Multiple processors may be included in, or coupled to, a single device or multiple devices.

The computer system 102 may also include a computer memory 106. The computer memory 106 may include a static memory, a dynamic memory, or both in communication. Memories described herein are tangible storage mediums that can store data and executable instructions, and are non-transitory during the time instructions are stored therein. Again, as used herein, the term "non-transitory" is to be interpreted not as an eternal characteristic of a state, but as a characteristic of a state that will last for a period of time. The term "non-transitory" specifically disavows fleeting characteristics such as characteristics of a particular carrier wave or signal or other forms that exist only transitorily in any place at any time. The memories are an article of manufacture and/or machine component. Memories described herein are computer-readable mediums from which data and executable instructions can be read by a computer. Memories as described herein may be random access memory (RAM), read only memory (ROM), flash memory, electrically programmable read only memory (EPROM), electrically erasable programmable read-only memory (EEPROM), registers, a hard disk, a cache, a removable disk, tape, compact disc read only memory (CD-ROM), digital versatile disc (DVD), floppy disk, blu-ray disc, or any other form of storage medium known in the art. Memories may be volatile or non-volatile, secure and/or encrypted, unsecure and/or unencrypted. Of course, the computer memory 106 may comprise any combination of memories or a single storage.

The computer system 102 may further include a display 108, such as a liquid crystal display (LCD), an organic light emitting diode (OLED), a flat panel display, a solid-state display, a cathode ray tube (CRT), a plasma display, or any other type of display, examples of which are well known to persons skilled in the art.

The computer system 102 may also include at least one input device 110, such as a keyboard, a touch-sensitive input screen or pad, a speech input, a mouse, a remote-control device having a wireless keypad, a microphone coupled to a speech recognition engine, a camera such as a video camera or still camera, a cursor control device, a global positioning system (GPS) device, an altimeter, a gyroscope, an accelerometer, a proximity sensor, or any combination thereof. Those skilled in the art appreciate that various embodiments of the computer system 102 may include multiple input devices 110. Moreover, those skilled in the art further appreciate that the above-listed, exemplary input devices 110 are not meant to be exhaustive and that the computer system 102 may include any additional, or alternative, input devices 110.

The computer system 102 may also include a medium reader 112 which is configured to read any one or more sets of instructions, e.g., software, from any of the memories described herein. The instructions, when executed by a processor, can be used to perform one or more of the methods and processes as described herein. In a particular embodiment, the instructions may reside completely, or at least partially, within the memory 106, the medium reader 112, and/or the processor 110 during execution by the computer system 102.

Furthermore, the computer system 102 may include any additional devices, components, parts, peripherals, hardware, software, or any combination thereof which are commonly known and understood as being included with or within a computer system, such as, but not limited to, a network interface 114 and an output device 116. The output device 116 may be, but is not limited to, a speaker, an audio out, a video out, a remote-control output, a printer, or any combination thereof.

Each of the components of the computer system 102 may be interconnected and communicate via a bus 118 or other communication link. As shown in FIG. 1, the components may each be interconnected and communicate via an internal bus. However, those skilled in the art appreciate that any of the components may also be connected via an expansion bus. Moreover, the bus 118 may enable communication via any standard or other specification commonly known and understood such as, but not limited to, peripheral component interconnect, peripheral component interconnect express, parallel advanced technology attachment, serial advanced technology attachment, etc.

The computer system 102 may be in communication with one or more additional computer devices 120 via a network 122. The network 122 may be, but is not limited to, a local area network, a wide area network, the Internet, a telephony network, a short-range network, or any other network commonly known and understood in the art. The short-range network may include, for example, Bluetooth®, Zigbee®, infrared, near field communication, ultraband, or any combination thereof. Those skilled in the art appreciate that additional networks 122 which are known and understood may additionally or alternatively be used and that the exemplary networks 122 are not limiting or exhaustive. Also, while the network 122 is shown in FIG. 1 as a wireless network, those skilled in the art appreciate that the network 122 may also be a wired network.

The additional computer device 120 is shown in FIG. 1 as a personal computer. However, those skilled in the art appreciate that, in alternative embodiments of the present application, the computer device 120 may be a laptop computer, a tablet PC, a personal digital assistant, a mobile device, a palmtop computer, a desktop computer, a communications device, a wireless telephone, a personal trusted device, a web appliance, a server, or any other device that is capable of executing a set of instructions, sequential or otherwise, that specify actions to be taken by that device. Of course, those skilled in the art appreciate that the above-listed devices are merely exemplary devices and that the device 120 may be any additional device or apparatus commonly known and understood in the art without departing from the scope of the present application. For example, the computer device 120 may be the same or similar to the computer system 102. Furthermore, those skilled in the art similarly understand that the device may be any combination of devices and apparatuses.

Of course, those skilled in the art appreciate that the above-listed components of the computer system 102 are merely meant to be exemplary and are not intended to be exhaustive and/or inclusive. Furthermore, the examples of the components listed above are also meant to be exemplary and similarly are not meant to be exhaustive and/or inclusive.

In accordance with various embodiments of the present disclosure, the methods described herein may be implemented using a hardware computer system that executes software programs. Further, in an exemplary, non-limited embodiment, implementations can include distributed processing, component/object distributed processing, and parallel processing. Virtual computer system processing can be constructed to implement one or more of the methods or functionalities as described herein, and a processor described herein may be used to support a virtual processing environment.

As described herein, various embodiments provide optimized methods and systems for facilitating quality assurance testing in various computing environments by providing test and regression automation via a cloud native elastic tool.

Figure 2:
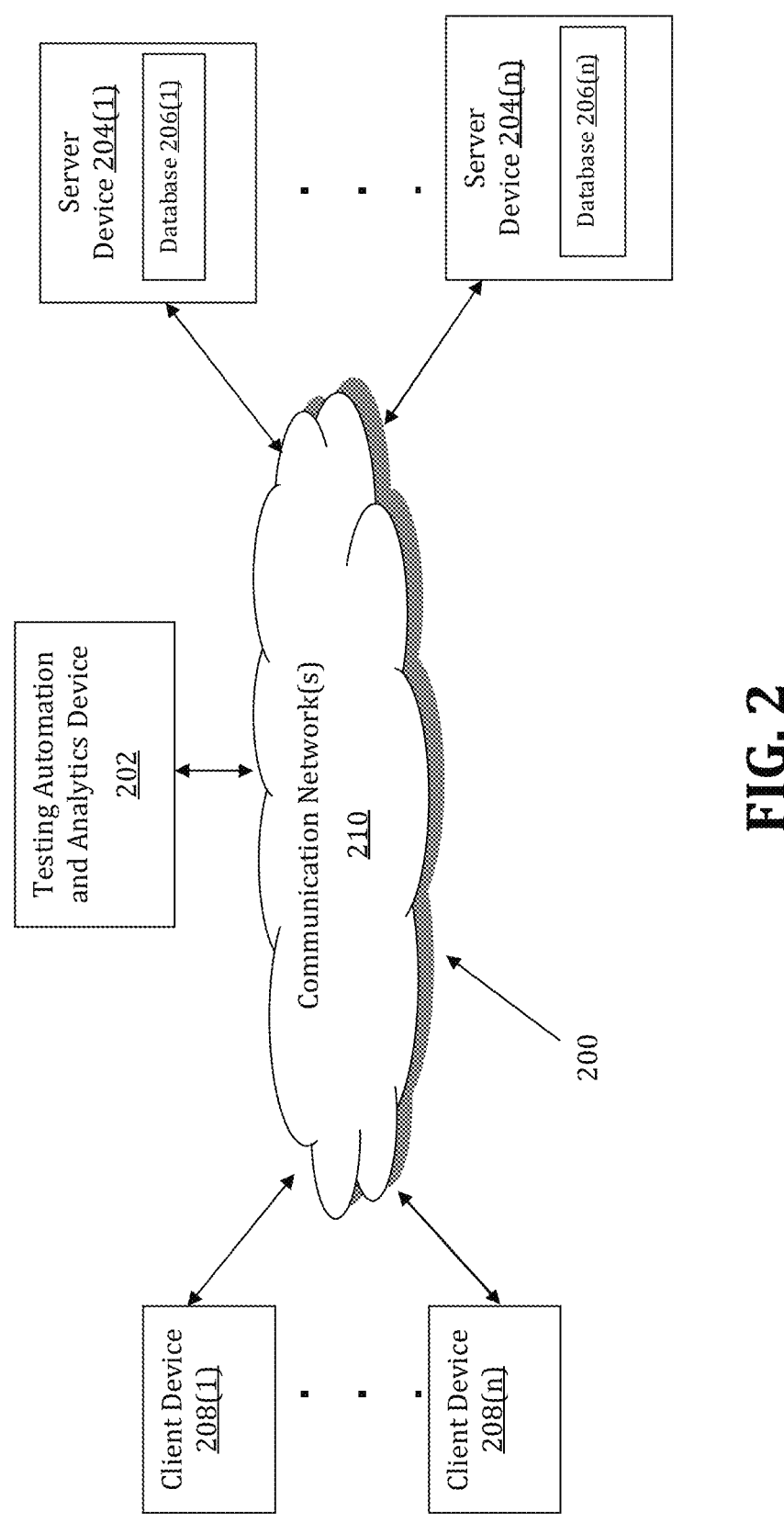
FIG. 2 illustrates an exemplary diagram of a network environment.

Referring to FIG. 2, a schematic of an exemplary network environment 200 for implementing a method for facilitating quality assurance testing in various computing environments by providing test and regression automation via a cloud native elastic tool is illustrated. In an exemplary embodiment, the method is executable on any networked computer platform, such as, for example, a personal computer (PC).

The method for facilitating quality assurance testing in various computing environments by providing test and regression automation via a cloud native elastic tool may be implemented by a Testing Automation and Analytics (TAA) device 202. The TAA device 202 may be the same or similar to the computer system 102 as described with respect to FIG. 1. The TAA device 202 may store one or more applications that can include executable instructions that, when executed by the TAA device 202, cause the TAA device 202 to perform actions, such as to transmit, receive, or otherwise process network messages, for example, and to perform other actions described and illustrated below with reference to the figures. The application(s) may be implemented as modules or components of other applications. Further, the application(s) can be implemented as operating system extensions, modules, plugins, or the like.

Even further, the application(s) may be operative in a cloud-based computing environment. The application(s) may be executed within or as virtual machine(s) or virtual server(s) that may be managed in a cloud-based computing environment. Also, the application(s), and even the TAA device 202 itself, may be located in virtual server(s) running in a cloud-based computing environment rather than being tied to one or more specific physical network computing devices. Also, the application(s) may be running in one or more virtual machines (VMs) executing on the TAA device 202. Additionally, in one or more embodiments of this technology, virtual machine(s) running on the TAA device 202 may be managed or supervised by a hypervisor.

In the network environment 200 of FIG. 2, the TAA device 202 is coupled to a plurality of server devices 204(1)-204(*n*) that hosts a plurality of databases 206(1)-206 (*n*), and also to a plurality of client devices 208(1)-208(*n*) via communication network(s) 210. A communication interface of the TAA device 202, such as the network interface 114 of the computer system 102 of FIG. 1, operatively couples and communicates between the TAA device 202, the server devices 204(1)-204(*n*), and/or the client devices 208 (1)-208(*n*), which are all coupled together by the communication network(s) 210, although other types and/or numbers of communication networks or systems with other types and/or numbers of connections and/or configurations to other devices and/or elements may also be used.

The communication network(s) 210 may be the same or similar to the network 122 as described with respect to FIG. 1, although the TAA device 202, the server devices 204(1)-204(*n*), and/or the client devices 208(1)-208(*n*) may be coupled together via other topologies. Additionally, the network environment 200 may include other network devices such as one or more routers and/or switches, for example, which are well known in the art and thus will not be described herein. This technology provides a number of advantages including methods, non-transitory computer readable media, and TAA devices that efficiently implement a method for facilitating quality assurance testing in various computing environments by providing test and regression automation via a cloud native elastic tool.

By way of example only, the communication network(s) 210 may include local area network(s) (LAN(s)) or wide area network(s) (WAN(s)), and can use TCP/IP over Ethernet and industry-standard protocols, although other types and/or numbers of protocols and/or communication networks may be used. The communication network(s) 210 in this example may employ any suitable interface mechanisms and network communication technologies including, for example, teletraffic in any suitable form (e.g., voice, modem, and the like), Public Switched Telephone Network (PSTNs), Ethernet-based Packet Data Networks (PDNs), combinations thereof, and the like.

The TAA device 202 may be a standalone device or integrated with one or more other devices or apparatuses, such as one or more of the server devices 204(1)-204(*n*), for example. In one particular example, the TAA device 202 may include or be hosted by one of the server devices 204(1)-204(*n*), and other arrangements are also possible. Moreover, one or more of the devices of the TAA device 202 may be in a same or a different communication network including one or more public, private, or cloud networks, for example.

The plurality of server devices 204(1)-204(*n*) may be the same or similar to the computer system 102 or the computer device 120 as described with respect to FIG. 1, including any features or combination of features described with respect thereto. For example, any of the server devices 204(1)-204 (*n*) may include, among other features, one or more processors, a memory, and a communication interface, which are coupled together by a bus or other communication link, although other numbers and/or types of network devices may be used. The server devices 204(1)-204(*n*) in this example may process requests received from the TAA device 202 via the communication network(s) 210 according to the HTTP-based and/or JavaScript® Object Notation (JSON) protocol, for example, although other protocols may also be used.

The server devices 204(1)-204(*n*) may be hardware or software or may represent a system with multiple servers in a pool, which may include internal or external networks. The server devices 204(1)-204(*n*) hosts the databases 206(1)-206 (*n*) that are configured to store data that relates to test configurations, test suites, testing conditions, testing parameters, verification results, execution statuses, dependencies, sequence priorities, reports, errors, and alerts.

Although the server devices 204(1)-204(*n*) are illustrated as single devices, one or more actions of each of the server devices 204(1)-204(*n*) may be distributed across one or more distinct network computing devices that together comprise one or more of the server devices 204(1)-204(*n*). Moreover, the server devices 204(1)-204(*n*) are not limited to a particular configuration. Thus, the server devices 204 (1)-204(*n*) may contain a plurality of network computing devices that operate using a controller/agent approach, whereby one of the network computing devices of the server devices 204(1)-204(*n*) operates to manage and/or otherwise coordinate operations of the other network computing devices.

The server devices 204(1)-204(*n*) may operate as a plurality of network computing devices within a cluster architecture, a peer-to peer architecture, virtual machines, or within a cloud architecture, for example. Thus, the technology disclosed herein is not to be construed as being limited to a single environment and other configurations and architectures are also envisaged.

The plurality of client devices 208(1)-208(*n*) may also be the same or similar to the computer system 102 or the computer device 120 as described with respect to FIG. 1, including any features or combination of features described with respect thereto. For example, the client devices 208 (1)-208(*n*) in this example may include any type of computing device that can interact with the TAA device 202 via communication network(s) 210. Accordingly, the client devices 208(1)-208(*n*) may be mobile computing devices, desktop computing devices, laptop computing devices, tablet computing devices, virtual machines (including cloud-based computers), or the like, that host chat, e-mail, or voice-to-text applications, for example. In an exemplary embodiment, at least one client device 208 is a wireless mobile communication device, i.e., a smart phone.

The client devices 208(1)-208(*n*) may run interface applications, such as standard web browsers or standalone client applications, which may provide an interface to communicate with the TAA device 202 via the communication network(s) 210 in order to communicate user requests and information. The client devices 208(1)-208(*n*) may further include, among other features, a display device, such as a display screen or touchscreen, and/or an input device, such as a keyboard, for example.

Although the exemplary network environment 200 with the TAA device 202, the server devices 204(1)-204(*n*), the client devices 208(1)-208(*n*), and the communication network(s) 210 are described and illustrated herein, other types and/or numbers of systems, devices, components, and/or elements in other topologies may be used. It is to be understood that the systems of the examples described herein are for exemplary purposes, as many variations of the specific hardware and software used to implement the examples are possible, as will be appreciated by those skilled in the relevant art(s).

One or more of the devices depicted in the network environment 200, such as the TAA device 202, the server devices 204(1)-204(*n*), or the client devices 208(1)-208(*n*), for example, may be configured to operate as virtual instances on the same physical machine. In other words, one or more of the TAA device 202, the server devices 204(1)-204(n), or the client devices 208(1)-208(n) may operate on the same physical device rather than as separate devices communicating through communication network(s) 210. Additionally, there may be more or fewer TAA devices 202, server devices 204(1)-204(n), or client devices 208(1)-208(n) than illustrated in FIG. 2.

In addition, two or more computing systems or devices may be substituted for any one of the systems or devices in any example. Accordingly, principles and advantages of distributed processing, such as redundancy and replication, also may be implemented, as desired, to increase the robustness and performance of the devices and systems of the examples. The examples may also be implemented on computer system(s) that extend across any suitable network using any suitable interface mechanisms and traffic technologies, including by way of example only teletraffic in any suitable form (e.g., voice and modem), wireless traffic networks, cellular traffic networks, Packet Data Networks (PDNs), the Internet, intranets, and combinations thereof.

Figure 3:
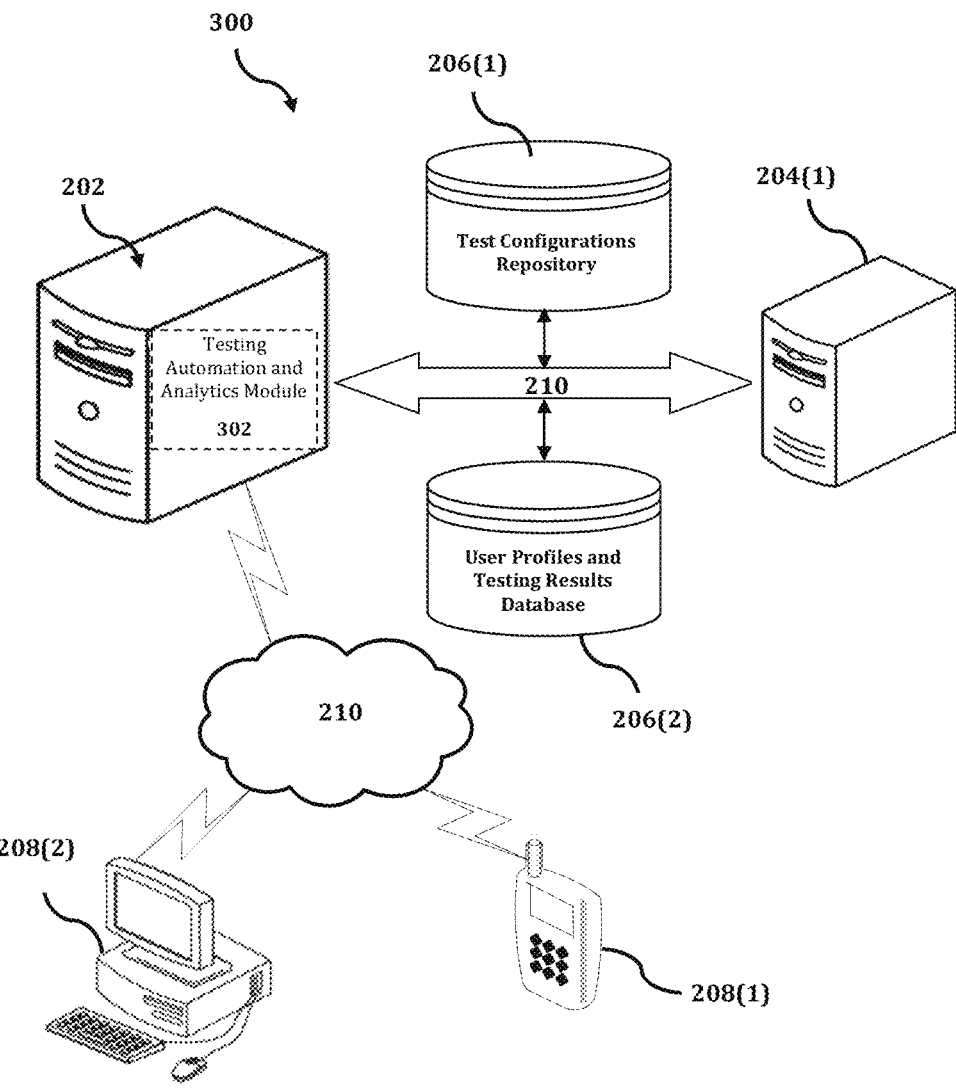
FIG. 3 shows an exemplary system for implementing a method for facilitating quality assurance testing in various computing environments by providing test and regression automation via a cloud native elastic tool.

The TAA device 202 is described and shown in FIG. 3 as including a testing automation and analytics module 302, although it may include other rules, policies, modules, databases, or applications, for example. As will be described below, the testing automation and analytics module 302 is configured to implement a method for facilitating quality assurance testing in various computing environments by providing test and regression automation via a cloud native elastic tool.

An exemplary process 300 for implementing a mechanism for facilitating quality assurance testing in various computing environments by providing test and regression automation via a cloud native elastic tool by utilizing the network environment of FIG. 2 is shown as being executed in FIG. 3. Specifically, a first client device 208(1) and a second client device 208(2) are illustrated as being in communication with TAA device 202. In this regard, the first client device 208(1) and the second client device 208(2) may be "clients" of the TAA device 202 and are described herein as such. Nevertheless, it is to be known and understood that the first client device 208(1) and/or the second client device 208(2) need not necessarily be "clients" of the TAA device 202, or any entity described in association therewith herein. Any additional or alternative relationship may exist between either or both of the first client device 208(1) and the second client device 208(2) and the TAA device 202, or no relationship may exist.

Further, TAA device 202 is illustrated as being able to access a test configurations repository 206(1) and a user profiles and testing results database 206(2). The testing automation and analytics module 302 may be configured to access these databases for implementing a method for facilitating quality assurance testing in various computing environments by providing test and regression automation via a cloud native elastic tool.

The first client device 208(1) may be, for example, a smart phone. Of course, the first client device 208(1) may be any additional device described herein. The second client device 208(2) may be, for example, a personal computer (PC). Of course, the second client device 208(2) may also be any additional device described herein.

The process may be executed via the communication network(s) 210, which may comprise plural networks as described above. For example, in an exemplary embodiment, either or both of the first client device 208(1) and the second client device 208(2) may communicate with the TAA device 202 via broadband or cellular communication. Of course, these embodiments are merely exemplary and are not limiting or exhaustive.

Upon being started, the testing automation and analytics module 302 executes a process for facilitating quality assurance testing in various computing environments by providing test and regression automation via a cloud native elastic tool. An exemplary process for facilitating quality assurance testing in various computing environments by providing test and regression automation via a cloud native elastic tool is generally indicated at flowchart 400 in FIG. 4.

In the process 400 of FIG. 4, at step S402, test configurations may be obtained. The test configurations may correspond to a test suite of a big data project. In an exemplary embodiment, the test configurations may be user defined and persisted in a file format such as, for example, a comma-separated values format. The test configurations may correspond to a data record that includes one or more fields separated by a predetermined separator. As will be appreciated by a person of ordinary skill in the art, the test configurations provided herein may reference a test configuration file that includes the test configurations as well as the test configurations itself.

In another exemplary embodiment, the user may define the test configurations via interactions with a graphical user interface. The graphical user interface may include graphical elements that are configured to receive input from the user. In another exemplary embodiment, the graphical user interface may be configured to automatically aggregate user input and generate test configuration files consistent with present disclosures. For example, the user may interact with the graphical user interface to provide necessary test parameters, which are then aggregated into a test configurations file. In another exemplary embodiment, the graphical user interface may utilize intelligent data capturing techniques such as, for example, smart data entry fields to aggregate specific information from the user. The intelligent data capturing techniques may display specific input fields for the user based on an analysis of previously provided information.

In another exemplary embodiment, the test configurations may define dependencies and testing sequence priorities for each of a plurality of test cases that correspond to the test suite. Each of the plurality of test cases may include predefined inputs and predefined, expected outputs. In another exemplary embodiment, the test suites may include multiple test cases. The test suite may relate to a collection of test cases that are intended to be used to test a software program. The test suite may be used to show that the software program has some specified set of behaviors. In another exemplary embodiment, the test cases may relate to a specification of the inputs, execution conditions, testing procedures, and expected results that define tests to be executed. The tests may be executed to achieve a particular software testing objective such as, for example, verify compliance with a specific requirement.

At step S404, the test configurations may be parsed to identify testing conditions for the test suite. In an exemplary embodiment, the disclosed system may read and parse the obtained test configurations to extract necessary information. The obtained test configurations may be divided into constituent parts and analyzed to facilitate identification of the necessary information. For example, a test configuration file may be parsed to reveal the test configurations, which are then analyzed to identity necessary testing conditions for the test suite.

In another exemplary embodiment, the testing conditions may correspond specifically to testing configuration information that is determined to be necessary for execution of the test suite. The testing conditions may relate to a specific set of test configurations. For example, the testing conditions may correspond to specific dependencies and testing sequence priorities that have been determined by the disclosed system to be necessary for execution of the test suite.

At step S406, testing parameters for executing the test suite may be determined based on the identified testing conditions. The testing parameters may be automatically determined consistent with present disclosures without additional user intervention. In an exemplary embodiment, the automatically determined testing parameters may facilitate execution of the test suite in a specific computing environment. The facilitation may include adjustments of dependencies and testing sequence priorities for each of a plurality of test cases that corresponds to the test suite. For example, the disclosed system may read and parse the test configurations to identify testing conditions, which are then used to determine a correct way of executing test cases that correspond to the test suite.

In another exemplary embodiment, the specific computing environment may be defined by the user as well as automatically determined based on the obtained test configurations. The specific computing environment may include at least one from among a cloud computing environment and an on-premise computing environment. In another exemplary embodiment, the testing parameters may be automatically determined to facilitate execution of the test suite according to predetermined guidelines. The predetermined guidelines may outline optimal execution criteria for the specific computing environment. For example, the predetermined guidelines may require certain dependencies for optimal execution when the test suite is to be executed in a cloud computing environment.

In another exemplary embodiment, automatically determining the testing parameters may include determining a predicted dependency for each of the plurality of test cases that correspond to the test suite. The predicted dependency may be automatically determined by using a model. Similarly, a predicted outcome for each of the plurality of test cases may also be determined. The predicted outcome may be automatically determined by using a model. Moreover, potential points of failure and corresponding causes of the failure may likewise be determined for the plurality of test cases. The potential points of failure and corresponding causes may be automatically determined by using a model.

In another exemplary embodiment, the model may include at least one from among a machine learning model, a mathematical model, a process model, and a data model. The model may also include stochastic models such as, for example, a Markov model that is used to model randomly changing systems. In stochastic models, the future states of a system may be assumed to depend only on the current state of the system.

In another exemplary embodiment, machine learning and pattern recognition may include supervised learning algorithms such as, for example, k-medoids analysis, regression analysis, decision tree analysis, random forest analysis, k-nearest neighbors analysis, logistic regression analysis, etc. In another exemplary embodiment, machine learning analytical techniques may include unsupervised learning algorithms such as, for example, Apriori analysis, K-means clustering analysis, etc. In another exemplary embodiment, machine learning analytical techniques may include reinforcement learning algorithms such as, for example, Markov Decision Process analysis, etc.

In another exemplary embodiment, the model may be based on a machine learning algorithm. The machine learning algorithm may include at least one from among a process and a set of rules to be followed by a computer in calculations and other problem-solving operations such as, for example, a linear regression algorithm, a logistic regression algorithm, a decision tree algorithm, and/or a Naive Bayes algorithm.

In another exemplary embodiment, the model may include training models such as, for example, a machine learning model which is generated to be further trained on additional data. Once the training model has been sufficiently trained, the training model may be deployed onto various connected systems to be utilized. In another exemplary embodiment, the training model may be sufficiently trained when model assessment methods such as, for example, a holdout method, a K-fold-cross-validation method, and a bootstrap method determine that at least one of the training model's least squares error rate, true positive rate, true negative rate, false positive rate, and false negative rates are within predetermined ranges.

In another exemplary embodiment, the training model may be operable, i.e., actively utilized by an organization, while continuing to be trained using new data. In another exemplary embodiment, the models may be generated using at least one from among an artificial neural network technique, a decision tree technique, a support vector machines technique, a Bayesian network technique, and a genetic algorithms technique.

At step S408, the test suite may be executed based on the automatically determined testing parameter. The test suite may be automatically executed based on the testing parameter in a computing environment consistent with present disclosures. In an exemplary embodiment, the computing environment may include a distributed computing environment. The distributed computing environment may facilitate processing of the test suite across multiple computing systems. In another exemplary embodiment, necessary adjustments may be made to the test suite to enable processing across multiple computing systems. The necessary adjustments may be performed automatically without additional user intervention. For example, test cases may be divided into subgroups and assigned to specific nodes within the distributed computing environment for synchronous processing to improve efficiency and performance.

In another exemplary embodiment, the necessary adjustments may be performed based on predetermined criteria such as, for example, predetermined efficiency criteria, predetermined performance criteria, and predetermined business criteria. The predetermined efficiency criteria may correspond to requirements relating to optimal execution of the test suites. For example, the predetermined efficiency criteria may dictate an execution sequence for the test cases. The predetermined performance criteria may correspond to requirements relating to optimal performance of the testing system. For example, the predetermined performance criteria may require distribution of the test cases across a plurality of nodes to balance processing loads. The predetermined business criteria may correspond to requirements relating to business objectives. For example, the predetermined business criteria may require usage of certain nodes to execute the test suite due to lower processing costs.

In another exemplary embodiment, the test suite may be executed based on a predetermined schedule. The test suite may be automatically executed based on a predetermined schedule that is defined in the test configurations. In another exemplary embodiment, the predetermined schedule may include at least one from among a continuous testing schedule and an intermittent testing schedule. The continuous testing schedule may relate to execution of the test suite at regular intervals such as, for example, once every week and/or once every month. The intermittent testing schedule may relate to triggering execution of the test suite based on predefined events such as, for example, at milestones in a continuous integration and continuous delivery (CI/CD) pipeline.

At step S410, results of the executing may be verified. In an exemplary embodiment, verifying the results may include automatically comparing each of the results with a corresponding output of a secondary execution of the test suite. The secondary execution may relate to secondary testing of the test suite from a different branch of a source code repository hosting service. The different branch may relate to a unique set of code changes to a repository with unique names that may be merged back into a main branch, which incorporates all of the changes.

Then, regression analysis and validation analysis may be used to automatically determine a verified status for each of the results. The verified status may be automatically determined based on an outcome of the comparing. The verified status may include at least one from among a passed status and a failed status. Lastly, each of the results may be automatically marked with the corresponding verified status. Consistent with present disclosures, the disclosed system may compare the results and mark the results as passing or failing without additional user intervention.

At step S412, a report may be generated for the test suite. The report may include information that corresponds to the automatically determined testing parameters, an execution status, and a verification result. In an exemplary embodiment, the report may be generated to aggregate information associated with execution of the test suite. The report may include the aggregated information in a file format similar to the file format of the testing configuration files. For example, the report may be persisted in a file format such as, for example, a comma-separated values format.

In another exemplary embodiment, information in the generated report may be available for a user via a graphical user interface such as, for example, a dashboard. The dashboard may utilize graphical elements to organize the information for the user. The user may interact with the graphical elements in the dashboard to track and audit results from a plurality of testing runs. In another exemplary embodiment, the generated report may be associated with a user profile and persisted. The persisted reports from multiple testing runs may be usable to train machine learning models consistent with present disclosures. The persisted reports may be usable to identify and save frequently used testing parameters for the user.

In another exemplary embodiment, the disclosed system may be configured to monitor various components within the computing environment to detect errors that correspond to execution of the test suite. The errors may include a testing failure due to an instability in the computing environment. Then, an action may be automatically initiated to re-execute the test suite based on an analysis of the error. For example, the disclosed system may automatically retry jobs associated with executing the test suite when detected errors indicate that the jobs failed due to cluster and/or infrastructure instabilities.

In another exemplary embodiment, alerts may be generated when errors are detected. The alerts may be automatically generated when the detected errors indicate that a failure has occurred in execution of the test suite. The alerts may include information that relates to the errors, the automatically initiated actions, and a determined origin of the errors. Then, a responsible user may be notified with the generated alerts. In another exemplary embodiment, the alerts may be provided to the responsible user based on a user preference. For example, the user preference may indicate that alerts are sent to a user email as well as displayed on a graphical user interface.

Figure 5:
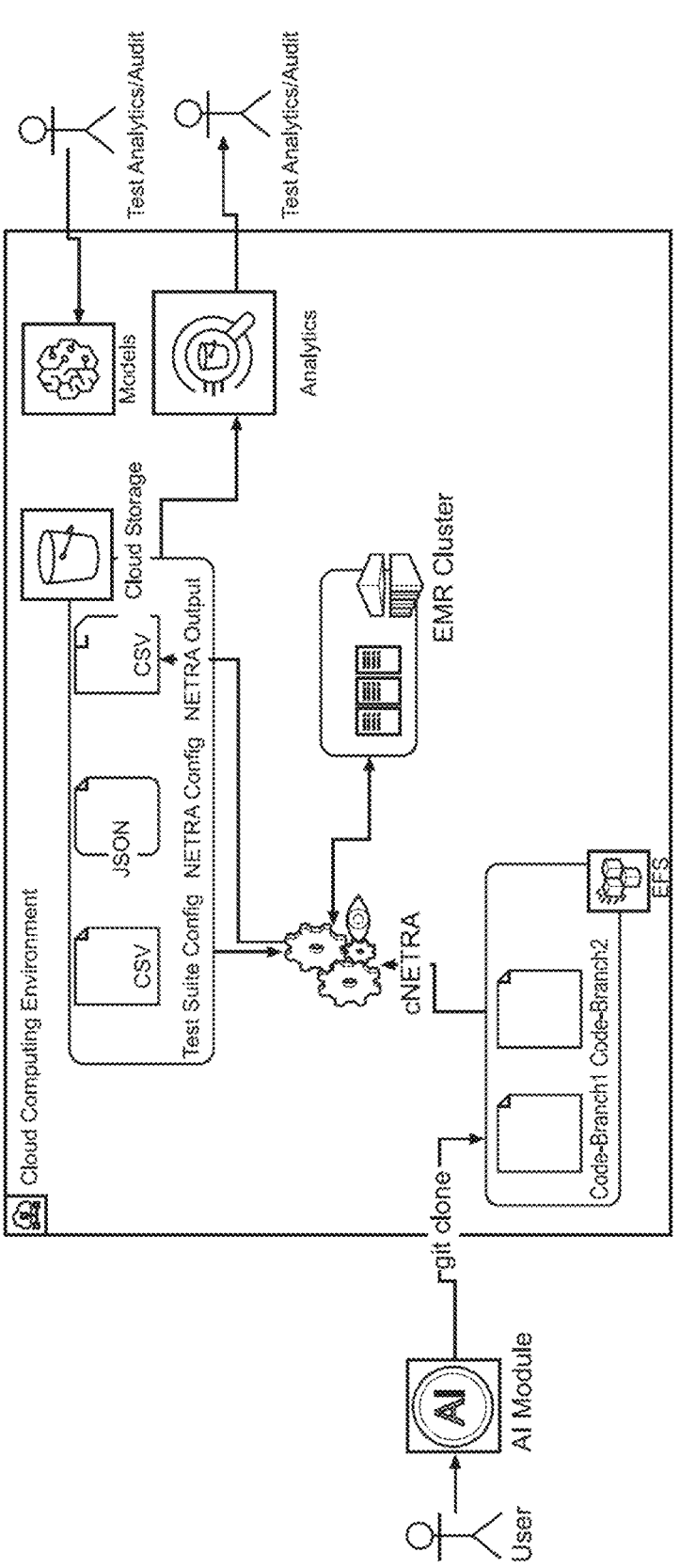
FIG. 5 is a design and architecture diagram of an exemplary process for implementing a method for facilitating quality assurance testing in various computing environments by providing test and regression automation via a cloud native elastic tool.

FIG. 5 is a design and architecture diagram 500 of an exemplary process for implementing a method for facilitating quality assurance testing in various computing environments by providing test and regression automation via a cloud native elastic tool. In FIG. 5, the disclosed system may be cloud native and operable on a variety of cloud computing environments from first-party cloud providers as well as from third-party cloud providers. As illustrated in FIG. 5, the disclosed system may facilitate test analytics and auditing of implemented machine learning models as well as testing outputs.

Figure 6:
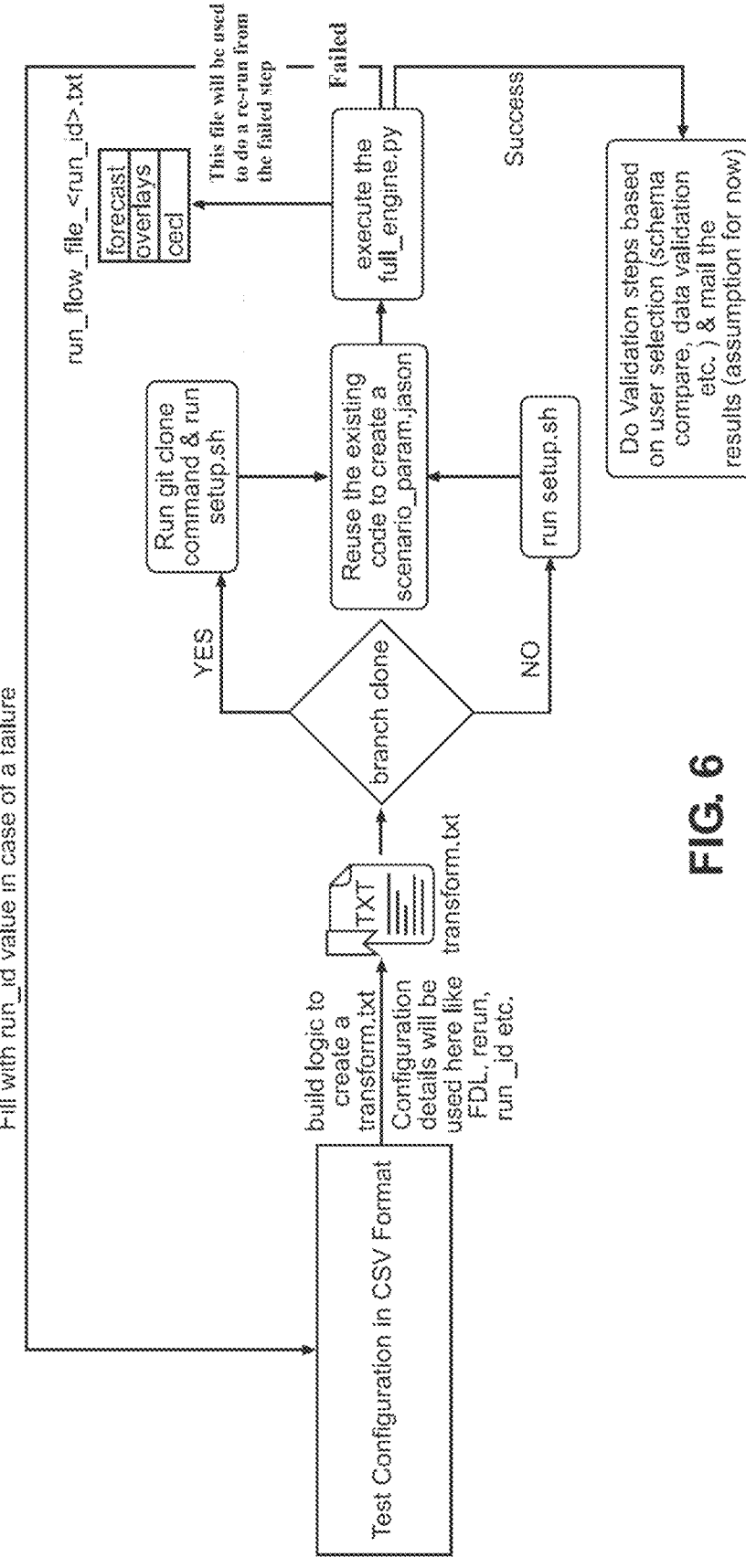
FIG. 6 is a logic diagram of an exemplary process for implementing a method for facilitating quality assurance testing in various computing environments by providing test and regression automation via a cloud native elastic tool.

FIG. 6 is a logic diagram 600 of an exemplary process for implementing a method for facilitating quality assurance testing in various computing environments by providing test and regression automation via a cloud native elastic tool. In FIG. 6, test configurations may be provided in a comma-separated values format. As illustrated in FIG. 6, the logic may be executed once for each row of data within the test configuration consistent with present disclosures.

Accordingly, with this technology, an optimized process for facilitating quality assurance testing in various computing environments by providing test and regression automation via a cloud native elastic tool is disclosed.

Although the invention has been described with reference to several exemplary embodiments, it is understood that the words that have been used are words of description and illustration, rather than words of limitation. Changes may be made within the purview of the appended claims, as presently stated and as amended, without departing from the scope and spirit of the present disclosure in its aspects. Although the invention has been described with reference to particular means, materials and embodiments, the invention is not intended to be limited to the particulars disclosed; rather the invention extends to all functionally equivalent structures, methods, and uses such as are within the scope of the appended claims.

For example, while the computer-readable medium may be described as a single medium, the term "computer-readable medium" includes a single medium or multiple media, such as a centralized or distributed database, and/or associated caches and servers that store one or more sets of instructions. The term "computer-readable medium" shall also include any medium that is capable of storing, encoding or carrying a set of instructions for execution by a processor or that cause a computer system to perform any one or more of the embodiments disclosed herein.

The computer-readable medium may comprise a non-transitory computer-readable medium or media and/or comprise a transitory computer-readable medium or media. In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. Accordingly, the disclosure is considered to include any computer-readable medium or other equivalents and successor media, in which data or instructions may be stored.

Although the present application describes specific embodiments which may be implemented as computer programs or code segments in computer-readable media, it is to be understood that dedicated hardware implementations, such as application specific integrated circuits, programmable logic arrays and other hardware devices, can be constructed to implement one or more of the embodiments described herein. Applications that may include the various embodiments set forth herein may broadly include a variety of electronic and computer systems. Accordingly, the present application may encompass software, firmware, and hardware implementations, or combinations thereof. Nothing in the present application should be interpreted as being implemented or implementable solely with software and not hardware.

Although the present specification describes components and functions that may be implemented in particular embodiments with reference to particular standards and protocols, the disclosure is not limited to such standards and protocols. Such standards are periodically superseded by faster or more efficient equivalents having essentially the same functions. Accordingly, replacement standards and protocols having the same or similar functions are considered equivalents thereof.

The illustrations of the embodiments described herein are intended to provide a general understanding of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, will be apparent to those of skill in the art upon reviewing the description.

The Abstract of the Disclosure is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

The above disclosed subject matter is to be considered illustrative, and not restrictive, and the appended claims are intended to cover all such modifications, enhancements, and other embodiments which fall within the true spirit and scope of the present disclosure. Thus, to the maximum extent allowed by law, the scope of the present disclosure is to be determined by the broadest permissible interpretation of the following claims and their equivalents, and shall not be restricted or limited by the foregoing detailed description.

What is claimed is:

1. A method for providing test and regression automation via a cloud native elastic tool, the method being implemented by at least one processor, the method comprising:

obtaining from a module comprising an artificial intelligence (AI) module at least one testing condition from at least one test configuration corresponding to at least one test suite;

implementing at least one machine learning (ML) model via the cloud native elastic tool operating in a computing environment that comprises a distributed computing environment;

training the at least one ML model based on a cross-validation technique and a holdout technique in operating within a predetermined range of error ratings that corresponds to at least one software testing parameter based on the at least one testing condition associated with at least one testing error involving instabilities of the computing environment comprising a cluster instability and an infrastructure instability;

executing the at least one test suite based on the at least one software testing parameter via the cloud native elastic tool;

performing within the cloud native elastic tool an automated software verification process comprising a regression algorithm on different branches of source code software of a source code repository hosting service to obtain at least one result based on the executing the at least one test suite; and outputting electronically via a graphical user interface a report for the at least one test suite via the cloud native elastic tool, the report including information that corresponds to the at least one software testing parameter, an execution status, and the at least one result.

2. The method of claim 1, further comprising:

detecting the at least one testing error that corresponds to the executing of the at least one test suite, the at least one testing error including a testing failure due to the instabilities of the computing environment; and automatically initiating via the cloud native elastic tool an action to re-execute the at least one test suite based on an analysis of the at least one testing error.

3. The method of claim 2, further comprising:

providing at least one alert when the at least one testing error is detected, the at least one alert including information that relates to the at least one testing error, the automatically initiated action, and a determined origin of the at least one testing error; and notifying at least one responsible user with the at least one alert.

4. The method of claim 1, wherein the at least one test configuration defines at least one dependency and at least one testing sequence priority for each of a plurality of test cases that corresponds to the at least one test suite, each of the plurality of test cases including at least one predefined input and at least one predefined, expected output.

5. The method of claim 1, wherein the at least one software testing parameter facilitates execution of the at least one test suite on at least one from among a cloud computing environment and an on-premise computing environment, and wherein the an adjustment of at least one dependency and at least one testing sequence priority for each of a plurality of test cases that corresponds to the at least one test suite.

6. The method of claim 1, further comprises:

determining, by the at least one ML model, at least one predicted dependency for each of a plurality of test cases that corresponds to the at least one test suite;

determining, by the at least one ML model, at least one predicted outcome for each of the plurality of test cases; and determining, by the at least one ML model, at least one potential point of failure and a corresponding cause for each of the plurality of test cases.

7. The method of claim 1, wherein the error ratings comprise at least one among from a least square error rate, a true positive rate, a true negative rate, a false positive rate, and a false negative rate.

8. The method of claim 1, wherein the at least one test suite is executed based on a predetermined schedule that is defined in the at least one test configuration, the predetermined schedule including at least one from among a continuous testing schedule and an intermittent testing schedule.

9. The method of claim 1, wherein the automated software verification to obtain the at least one result further comprises:

automatically comparing each of the at least one result with a corresponding output of a secondary execution of the at least one test suite, the secondary execution relating to secondary testing of the at least one test suite from a different branch of a source code repository hosting service;

automatically determining based on the regression and a validation analysis automation via the cloud native elastic tool, a verified status for each of the at least one result based on an outcome of the comparing, the verified status including at least one from among a passed status and a failed status; and automatically marking each of the at least one result with the corresponding verified status.

10. A computing device configured to implement an execution of a method for providing test and regression automation via a cloud native elastic tool, the computing device comprising:

a processor;

a memory; and a communication interface coupled to each of the processor and the memory, wherein the processor is configured to:

obtain from a module comprising an artificial intelligence (AI) module at least one testing condition from at least one test configuration corresponding to at least one test suite;

implement at least one machine learning (ML) model via the cloud native elastic tool operating in a computing environment that comprises a distributed computing environment;

train the at least one ML model based on a cross-validation technique and a holdout technique in operating within a predetermined range of error ratings that corresponds to at least one software testing parameter based on the at least one testing condition associated with at least one testing error involving instabilities of the computing environment comprising a cluster instability and an infrastructure instability;

execute the at least one test suite based on the at least one software testing parameter via the cloud native elastic tool;

perform within the cloud native elastic tool an automated software verification process comprising a regression algorithm on different branches of source code software of a source code repository hosting service to obtain at least one result based on the execute the at least one test suite; and output electronically via a graphical user interface a report for the at least one test suite via the cloud native elastic tool, the report including information that corresponds to the at least one software testing parameter, an execution status, and the at least one result.

11. The computing device of claim 10, wherein the processor is further configured to:

detect the at least one testing error that corresponds to the execute of the at least one test suite, the at least one testing error including a testing failure due to the instabilities of the computing environment; and automatically initiate via the cloud native elastic tool an action to re-execute the at least one test suite based on an analysis of the at least one testing error.

12. The computing device of claim 11, wherein the processor is further configured to:

provide at least one alert when the at least one testing error is detected, the at least one alert including information that relates to the at least one testing error, the automatically initiated action, and a determined origin of the at least one testing error; and notify at least one responsible user with the at least one alert.

13. The computing device of claim 10, wherein the at least one test configuration defines at least one dependency and at least one testing sequence priority for each of a plurality of test cases that corresponds to the at least one test suite, each of the plurality of test cases including at least one predefined input and at least one predefined, expected output.

14. The computing device of claim 10, wherein the at least one software testing parameter facilitates execution of the at least one test suite on at least one from among a cloud computing environment and an on-premise computing environment, and wherein the facilitation including adjustment of at least one dependency and at least one testing sequence priority for each of a plurality of test cases that corresponds to the at least one test suite.

15. The computing device of claim 10, wherein the processor is further configured to:

determine, by the least one ML model, at least one predicted dependency for each of a plurality of test cases that corresponds to the at least one test suite;

determine, by the at least one ML model, at least one predicted outcome for each of the plurality of test cases; and determine, by the at least one ML model, at least one potential point of failure and a corresponding cause for each of the plurality of test cases.

16. The computing device of claim 10, wherein the error ratings comprise at least one among from a least square error rate, a true positive rate, a true negative rate, a false positive rate, and a false negative rate.

17. The computing device of claim 10, wherein the processor is further configured to execute the at least one test suite based on a predetermined schedule that is defined in the at least one test configuration, the predetermined schedule including at least one from among a continuous testing schedule and an intermittent testing schedule.

18. The computing device of claim 10, wherein to perform the automated software verification to obtain the at least one result, the processor is further configured to:

automatically compare each of the at least one result with a corresponding output of a secondary execution of the at least one test suite, the secondary execution relating to secondary testing of the at least one test suite from a different branch of a source code repository hosting service;

automatically determine based on the regression and a validation analysis automation via the cloud native elastic tool, a verified status for each of the at least one result based on an outcome of the comparing, the verified status including at least one from among a passed status and a failed status; and automatically mark each of the at least one result with the corresponding verified status.

19. A non-transitory computer readable storage medium storing instructions for providing test and regression automation via a cloud native elastic tool, the storage medium comprising executable code which, when executed by a processor, causes the processor to:

obtain from a module comprising an artificial intelligence (AI) module at least one testing condition from at least one test configuration, the at least one test configuration corresponding to at least one test suite;

implement at least one machine learning (ML) model via the cloud native elastic tool operating in a computing environment that comprises a distributed computing environment;

train the at least one ML model based on a cross-validation technique and a holdout technique in operating within a predetermined range of error ratings that corresponds to at least one software testing parameter based on the at least one testing condition associated with at least one testing error involving instabilities of the computing environment comprising a cluster instability and an infrastructure instability;

execute the at least one test suite based on the at least one software testing parameter via the cloud native elastic tool;

perform within the cloud native elastic tool an automated software verification process comprising a regression algorithm on different branches of source code software of a source code repository hosting service to obtain at least one result based on the executing the at least one test suite; and output electronically via a graphical user interface a report for the at least one test suite via the cloud native elastic tool, the report including information that corresponds to the at least one software testing parameter, an execution status, and the at least one result.

20. The storage medium of claim 19, wherein the executable code which, when executed by the processor, further causes the processor to:

detect the at least one testing error that corresponds to the execute of the at least one test suite, the at least one testing error including a testing failure due to the instabilities of the computing environment; and automatically initiate via the cloud native elastic tool an action to re-execute the at least one test suite based on an analysis of the at least one testing error.

* * * * *